(12) United States Patent
Ishino

(10) Patent No.: US 7,576,529 B2
(45) Date of Patent: Aug. 18, 2009

(54) STEP-DOWN TYPE SWITCHING REGULATOR

(75) Inventor: Tsutomu Ishino, Kyoto (JP)

(73) Assignee: Rohm Co., Ltd. (JP)

( * ) Notice: Subject to any disclaimer, the term of this patent is extended or adjusted under 35 U.S.C. 154(b) by 37 days.

(21) Appl. No.: 11/995,009

(22) PCT Filed: Jun. 26, 2006

(86) PCT No.: PCT/JP2006/312718

§ 371 (c)(1),
(2), (4) Date: Jan. 8, 2008

(87) PCT Pub. No.: WO2007/007539

PCT Pub. Date: Jan. 18, 2007

(65) Prior Publication Data

US 2009/0033299 A1    Feb. 5, 2009

(30) Foreign Application Priority Data

Jul. 8, 2005    (JP) .............................. 2005-199688

(51) Int. Cl.
*G05F 1/40*    (2006.01)
(52) U.S. Cl. .................. 323/284; 323/225; 323/285
(58) Field of Classification Search .................. 323/222, 323/225, 282, 283, 284, 285, 351
See application file for complete search history.

(56) References Cited

U.S. PATENT DOCUMENTS 5,912,552 A * 6/1999 Tateishi ...................... 323/285
7,166,993 B2 * 1/2007 Shimizu et al. ............. 323/282
7,352,160 B2 * 4/2008 Shimizu et al. ............. 323/282
2009/0072626 A1 * 3/2009 Watanabe et al. ............. 307/85

FOREIGN PATENT DOCUMENTS

| JP | 2000-92824 A | 3/2000 |
| JP | 2002-252971 A | 9/2002 |
| JP | 2002-281743 A | 9/2002 |
| JP | 2003-319643 A | 11/2003 |
| JP | 2004-32875 A | 1/2004 |
| JP | 2004-364488 A | 12/2004 |
| JP | 2005-65447 A | 3/2005 |

OTHER PUBLICATIONS

International Search Report for International Application No. PCT/JP2006-312718 mailed Sep. 19, 2006.
Written Opinion of the International Searching Authority for PCT/JP2006-312712 mailed Sep. 19, 2006.

* cited by examiner

*Primary Examiner*—Jessica Han
(74) *Attorney, Agent, or Firm*—Cantor Colburn LLP

(57) ABSTRACT

A pulse signal generating circuit generates a pulse signal having a duty ratio controlled such that the output voltage approaches a reference voltage. A driver circuit generates first and second gate voltages, which are to be respectively applied to the gates of a switching transistor and a synchronous rectifier transistor, based upon the pulse signal. A threshold voltage generating unit generates a threshold voltage which is synchronous with the second gate voltage, and which is in the high-level state during a period when the synchronous rectifier transistor is to be turned off and in the low-level state during a period when the synchronous rectifier transistor is to be turned on. A light-load detection comparator compares a switching voltage with the threshold voltage, and outputs a light-load detection signal.

10 Claims, 7 Drawing Sheets

FIG.8A
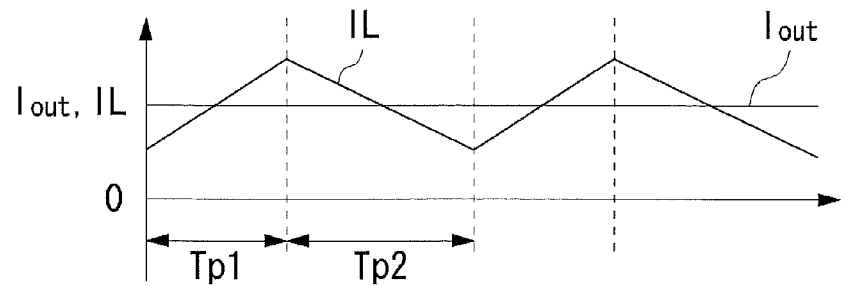
FIG.8B
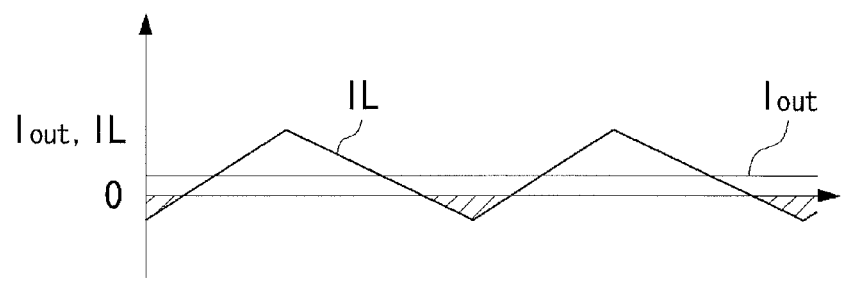
FIG.9A  Vsw, Vth
FIG.9B  Vcmp
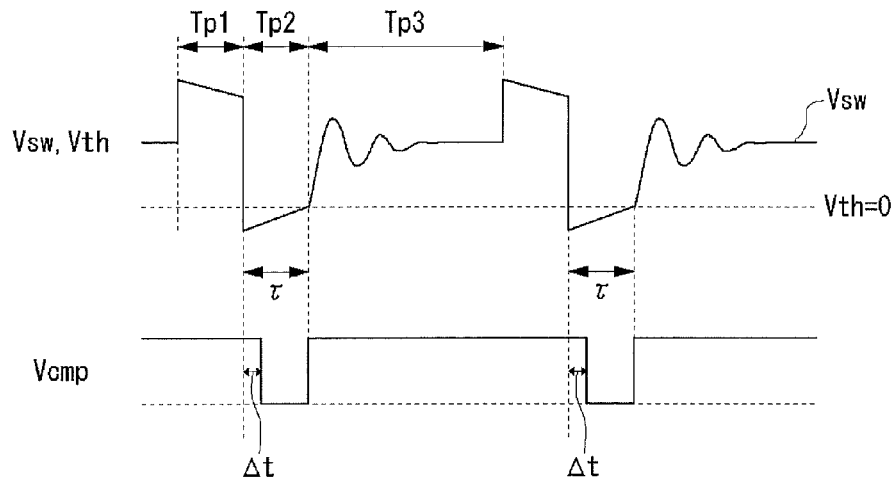

STEP-DOWN TYPE SWITCHING REGULATOR

CROSS REFERENCE TO RELATED APPLICATIONS

This is a U.S. national stage of application No. PCT/JP2006/312718, filed on 26 Jun. 2006. Priority under 35 U.S.C. §119(a) and 35 U.S.C. §365(b) is claimed from Japanese Application No. 2005-199688, filed 8 Jul., 2005, the disclosure of which is also incorporated herein by reference.

BACKGROUND OF THE INVENTION

1. Field of the Invention

The present invention relates to a step-down switching regulator, and particularly to a control technique for a synchronous rectification switching regulator.

2. Description of the Related Art

In recent years, microprocessors for providing digital signal processing are mounted in various electronic devices such as cellular phones, PDAs (Personal Digital Assistants), notebook-sized personal computers, etc. The power supply voltage necessary for driving such a microprocessor is being reduced as the fine semiconductor manufacturing process is being improved. For example, a microprocessor is known which operates at a low voltage of 1.5 V or less.

A battery such as a lithium ion battery or the like is mounted on such electronic devices as a power supply. The lithium ion battery outputs voltage of around 3 V to 4V. Such an arrangement, in which the output voltage is directly supplied to the microprocessor, leads to wasteful power consumption, and accordingly, in general, after the battery voltage is stepped down using a step-down switching regulator, a series regulator, or the like, the constant voltage thus stepped down is supplied to the microprocessor.

Two types of step-down switching regulators are known. One is a switching regulator using a rectifier diode (which will be referred to as a "rectifier diode switching regulator" hereafter). The other is a switching regulator using a rectifier transistor instead of the rectifier diode (which will be referred to as a "synchronous rectification switching regulator" hereafter). The former type has the advantage of exhibiting high efficiency when a low load current is applied to a load. However, such an arrangement requires a diode, in addition to an output inductor and an output capacitor, in the form of external components to a control circuit, leading to a large circuit area. On the other hand, the latter type provides poor efficiency when a low current is supplied to the load, as compared with the former type. However, with such an arrangement, a transistor is employed instead of a diode, which allows the control circuit to be integrated in the form of an LSI. This offers a small circuit area incorporating peripheral components. There is a demand for reducing the size of electronic devices such as cellular phones. In many cases, a switching regulator using a rectifier transistor (which will be referred to as a "synchronous rectification switching regulator" hereafter) is employed in such an arrangement in order to satisfy such a demand for a reduced size.

Directing our attention to the microprocessor employed in the aforementioned electronic devices, when the microprocessor operates for performing computation processing, a certain amount of current flows through the microprocessor. On the other hand, when the microprocessor is in the standby state, only a small amount of current flows through the microprocessor. FIG. 8A is a diagram which shows the current waveform with respect to time when the synchronous rectification switching regulator is connected to a heavy load. FIG. 8B is a diagram which shows the current waveform with respect to time when the synchronous rectification switching regulator is connected to a light load. In these drawings, IL represents the current that flows through the output inductor (which will also be referred to as the "inductor current IL" hereafter). Iout represents the load current. Here, the load current Iout is obtained by averaging the inductor current IL over time. As shown in FIG. 8A, when the synchronous rectification switching regulator is connected to a heavy load, the load current Iout is large. Accordingly, the inductor current IL is always positive. Here, the inductor current IL flowing toward the load is positive by definition. On the other hand, let us consider a case in which the synchronous rectification switching regulator is connected to a light load as shown in FIG. 8B. In this case, reduction of the load current Iout leads to a negative inductor current IL as indicated by the hatched portion in FIG. 8B. That is to say, in this stage, the inductor current IL flows through the output inductor in the reverse direction. As a result, with such an arrangement employing the synchronous rectification method, when the synchronous rectification switching regulator is connected to a light load, current flows from the output inductor to the ground through the synchronous rectifier transistor. This current is supplied from the output capacitor, but is not supplied to the load. This leads to wasteful power consumption.

For example, Patent documents 1 through 3 disclose switching regulators each of which has a function of switching rectification methods between the synchronous rectification method and the diode rectification method based upon the load current. In the techniques described in Patent documents 2 and 3, the inductor current IL is monitored. In a case in which the inductor current changes from a positive value to a negative value, the synchronous rectifier transistor is turned off, thereby improving the efficiency.

[Patent Document 1]
  Japanese Patent Application Laid-open No. 2004-32875

[Patent Document 2]
  Japanese Patent Application Laid-open No. 2002-252971

[Patent Document 3]
  Japanese Patent Application Laid-open No. 2003-319643

Conceivable examples of arrangements having a function of detecting the direction of the inductor current include: an arrangement in which a resistor is connected to the output inductor in series, and the voltage between both terminals of the resistor is monitored; and an arrangement in which the voltage at the node between the switching transistor and the synchronous rectifier transistor (which will be referred to as the "switching voltage Vsw" hereafter) is monitored. FIG. 9A is a time chart which shows the switching voltage Vsw when a light load is connected to the switching regulator. As shown in FIG. 9A, when the light load is connected to the switching regulator, the switching voltage Vsw is the high-level state during a period of time Tp1 in which the switching transistor is in the ON state. Next, during a period of time Tp2 in which the synchronous rectifier transistor is in the ON-state, the switching voltage Vsw temporarily becomes negative, following which the switching voltage Vsw gradually increases as the inductor current IL is reduced. Subsequently, the switching voltage Vsw becomes 0 V at the point in time when the direction of the inductor current IL reverses (which will also be referred to as the "zero-crossing point" hereafter). Using this mechanism, the light load state can be detected by making a comparison between the switching voltage Vsw and the threshold voltage Vth (=0V). During a period of time Tp3, both the switching transistor and the synchronous rectifier transistor are in the OFF state.

In general, a comparator is employed in order to make a comparison between the switching voltage Vsw and the threshold voltage Vth. The comparator has a limited response speed. Accordingly, the output signal of the comparator changes after the elapse of a delay time ΔT from the point in time when the magnitude relation between the two comparison-target voltages changes. FIG. 9B shows the output signal Vcmp of the comparator that makes a comparison between the switching voltage Vsw shown in FIG. 9A and the threshold voltage (=0 V). Here, when the switching voltage Vsw is greater than the threshold voltage Vth, the output voltage Vcmp is in the high-level state. On the other hand, when the switching voltage Vsw is smaller than the threshold voltage Vth, the output voltage Vcmp is in the low-level state.

With an arrangement in which the threshold voltage Vth is set to the fixed value 0 V, during the period of time Tp1 in which the switching transistor is in the ON state, the output voltage Vcmp of the comparator is in the high-level state. When the switching transistor is turned off, the switching voltage Vsw becomes smaller than the threshold voltage Vth. Subsequently, the output signal Vcmp of the comparator becomes low-level. Specifically, the transition in the output signal Vcmp requires a delay time Δt. With such an arrangement, if the period of time τ from the point in time when the switching transistor is turned off and the synchronous rectifier transistor is turned on, up to the point in time when the direction of the inductor current IL reverses is smaller than the delay time Δt, the comparator cannot detect the zero-crossing point.

SUMMARY OF THE INVENTION

The present invention has been made in view of the aforementioned problem. It is a general purpose of the present invention to provide a synchronous rectifier step-down switching regulator, and particularly to provide a step-down switching regulator and a control circuit thereof which is capable of detecting in a sure manner the point in time when the direction of the inductor current reverses even if the switching regulator is connected to a light load.

An embodiment of the present invention relates to a control circuit for controlling a synchronous rectifier step-down switching regulator. The control circuit comprises: an output stage which includes a switching transistor and a synchronous rectifier transistor connected in series, and which supplies a switching voltage at a connection node between the two transistors to a switching regulator output circuit connected as an external component to the control circuit; a pulse signal generating circuit which generates a pulse signal having a duty ratio controlled such that the output voltage of the switching regulator approaches a predetermined reference voltage; a driver circuit which generates first and second gate voltages, which are to be applied to the gates of the switching transistor and the synchronous rectifier transistor, based upon the pulse signal; and a light-load detection circuit which compares the switching voltage with a threshold voltage that is synchronous with the second gate voltage, and that is in the high-level state in a period when the synchronous rectifier transistor is to be turned off and in the low-level state in a period when the synchronous rectifier transistor is to be turned on, and which is configured such that, when the switching voltage is greater than the threshold voltage, the light-load detection circuit outputs a light-load detection signal at a predetermined level. With such an arrangement, upon reception of the light-load detection signal at the aforementioned predetermined level from the light-load detection circuit, the driver circuit controls the second gate voltage so as to forcibly turn off the synchronous rectifier transistor.

With such an embodiment, during a period when the switching transistor is in the ON-state, the threshold voltage (which will be represented by "Vth" hereafter) is in the high-level state. Accordingly, the relation Vsw<Vth is satisfied between the switching voltage (which will be represented by "Vsw" hereafter) and the threshold voltage Vth. As a result, the output of the light-load detection comparator transits to a level that differs from the aforementioned predetermined level prior to the detection of the point in time at which the direction of the inductor current reverses (which will also be referred to as the "zero-crossing point" hereafter), thereby providing the condition for the detection of the zero-crossing point. Thus, such an arrangement is capable of detecting in a sure manner the point in time at which the inductor current reverses.

Also, the light-load detection circuit may include: a threshold voltage generating unit which generates a threshold voltage that is synchronous with the second gate voltage, and that is in the high-level state during a period when the synchronous rectifier transistor is to be turned off and in the low-level state during a period when the synchronous rectifier transistor is to be turned on; and a light-load detection comparator which compares the switching voltage with the threshold voltage.

Also, the threshold voltage may be the logically inverted signal of the second gate voltage. Also, the threshold voltage generating unit may include an inverter, the input terminal of which is connected to the gate of the synchronous rectifier transistor. With such an arrangement, the output signal of the inverter may be output as the threshold voltage.

Also, the driver circuit may forcibly turn off the synchronous rectifier transistor during a period from the point in time at which the light-load detection comparator outputs a light-load detection signal at the predetermined level up to the point in time at which the pulse signal instructs the switching transistor to turn on. Also, the driver circuit may include a D flip-flop, the clock terminal of which receives the light-load detection signal, and the reset terminal of which receives a signal that corresponds to the pulse signal, and the data terminal of which receives a high-level signal. With such an arrangement, the synchronous rectifier transistor may be forcibly turned off during a period when the output signal of the flip-flop is in the high-level state.

After the synchronous rectifier transistor is turned off as a result of the zero-crossing point being detected in the operation with a light load, the output voltage of the step-down switching regulator temporarily increases. Subsequently, the output voltage decreases to around the reference voltage due to the current flowing through the load. In this stage, the switching operation is stopped until the switching transistor is instructed to turn on. During a period when the switching operation is stopped, the gate driving current flows through neither the switching transistor M1 nor the synchronous rectifier transistor M2. Thus, such an arrangement reduces the current consumption of the control circuit.

Also, the control circuit may be monolithically integrated on a single semiconductor substrate. Examples of arrangements "monolithically integrated" include: an arrangement in which all the components of a circuit are integrated on a semiconductor substrate; and an arrangement in which principal components of a circuit are integrated. With such an arrangement, a part of the resistors, capacitors, and so forth, for adjusting circuit constants, may be provided in the form of components external to the semiconductor substrate.

Another embodiment of the present invention relates to a step-down switching regulator. The step-down switching regulator comprises: a switching regulator output circuit which includes an output capacitor with one grounded terminal, and an output inductor with one terminal connected to the other terminal of the output capacitor; and the above-described control circuit which supplies a switching voltage to the switching regulator output circuit. With such an arrangement, the output at the other terminal of the output capacitor is output as the output voltage.

Such an embodiment provides a function of detecting the zero-crossing point in a sure manner even if the operation state of the load connected to the step-down switching regulator changes and becomes light. This reduces the current consumption of the circuit.

Yet another embodiment of the present invention relates to an electronic device. The electronic device comprises: a battery which outputs battery voltage; a microprocessor; and the above-described step-down switching regulator which steps down the battery voltage, and which supplies the battery voltage thus stepped down to the microprocessor.

Such an embodiment performs the step-down operation with high efficiency even if the microprocessor enters the sleep state and the load current accordingly decreases. Thus, such an embodiment extends the life of the battery.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 8A and 8B are diagrams which show the current waveforms over time in a heavy-load state and in a light-load state; and FIGS. 9A and 9B are time charts for describing detection of the light-load state.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
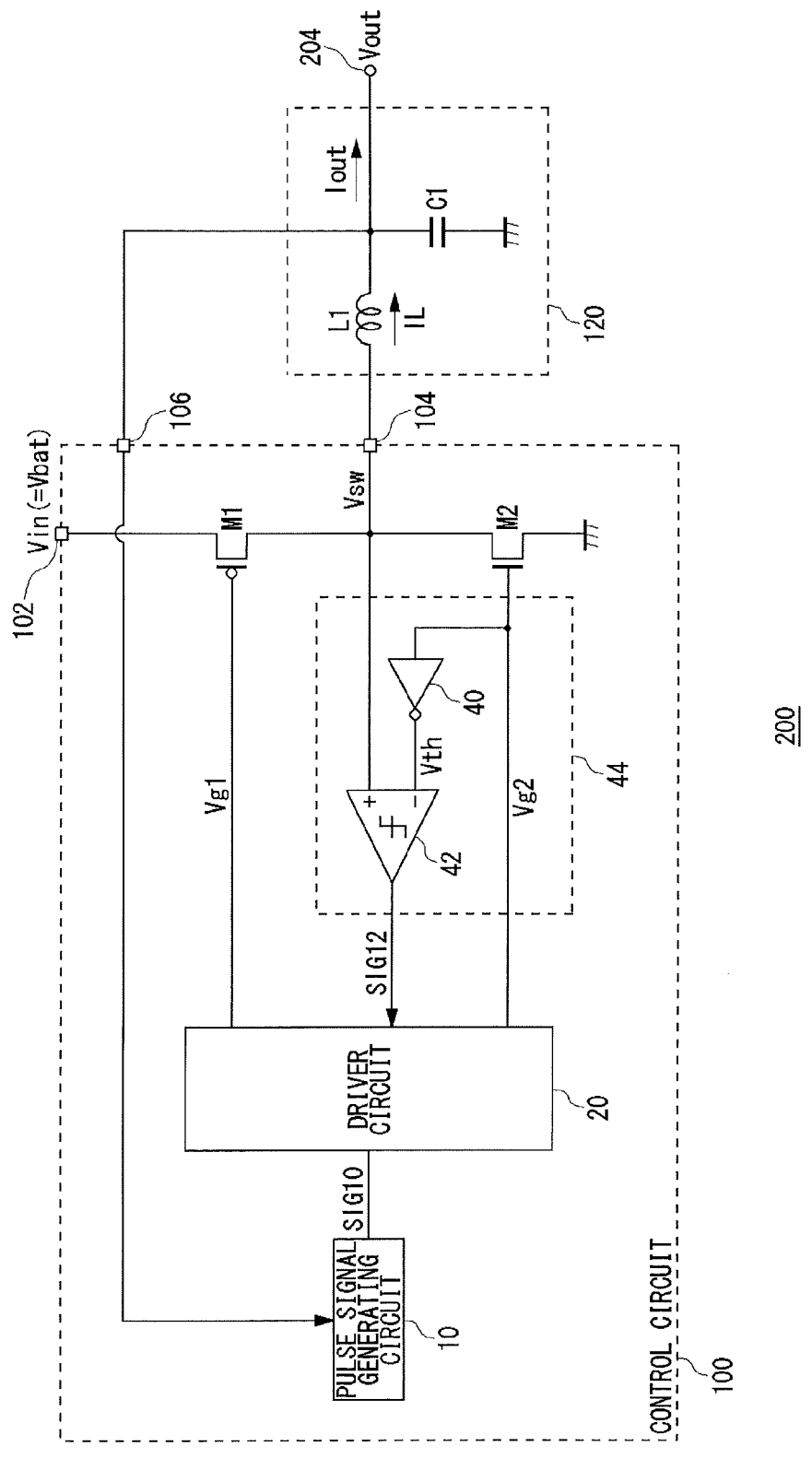
FIG. 1 is a circuit diagram which shows a configuration of a step-down switching regulator according to an embodiment.
Figure 2:
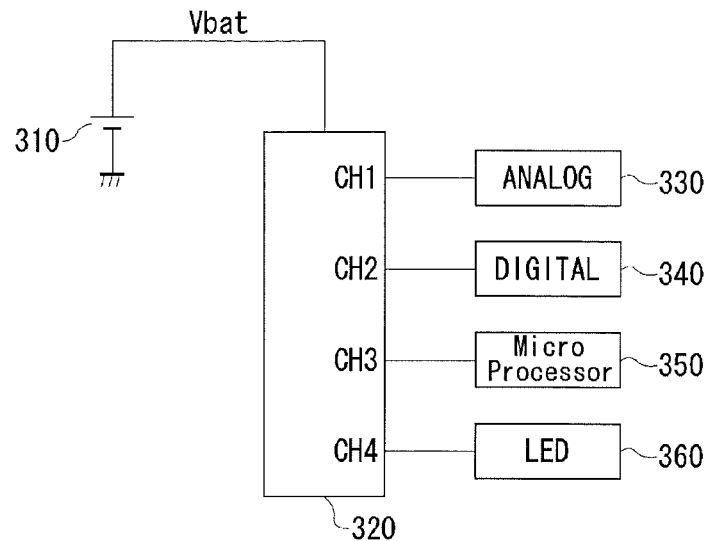
FIG. 2 is a block diagram which shows a configuration of an electronic device mounting the step-down switching regulator shown in FIG. 1.

FIG. 1 is a circuit diagram which shows a configuration of a step-down switching regulator 200 according to an embodiment. FIG. 2 is a block diagram which shows a configuration of an electronic device 300 mounting the step-down switching regulator 200 shown in FIG. 1. The electronic device 300 is a small-sized battery-driven information terminal such as a cellular phone terminal, a CD player, a PDA, or the like, for example. Description will be made below regarding an arrangement in which the electronic device 300 is a cellular phone terminal.

The electronic device 300 includes a battery 310, a power supply device 320, an analog circuit 330, a digital circuit 340, a microprocessor 350, and an LED 360. The battery 310 is a lithium ion battery, for example, and outputs a battery voltage Vbat of around 3.4 V. The analog circuit 330 includes high-frequency circuits such as a power amplifier, an antenna switch, an LNA (Low Noise Amplifier), a mixer, a PLL (Phase Locked Loop), etc. The power supply voltage Vcc (=around 3.4 V) is required for the stable operations of such circuit blocks. The digital circuit 340 includes various kinds of DSPs (Digital Signal Processors) and so forth. The power supply voltage Vdd (=around 3 to 4 V) is also required for the stable operations of such circuit blocks. The microprocessor 350 is a block which integrally controls the overall operation of the electronic device 300. The microprocessor 350 operates at the power supply voltage of 1.5 V. The LED 360 includes three kinds of LEDs (Light Emitting Diodes) consisting of red, green, and blue LEDs. The LED 360 is used as a back light for the liquid crystal or as an illumination device. The operation of the LED 360 requires the driving voltage of 4 V or more.

The power supply device 320 is a multi-channel switching power supply which includes multiple switching regulators each of which steps up or steps down the battery voltage Vbat as necessary for the respective channels. Specifically, the power supply device 320 supplies suitable power supply voltages to the analog circuit 330, the digital circuit 340, the microprocessor 350, and the LED 360.

The step-down switching regulator 200 shown in FIG. 1 according to the present embodiment is preferably employed as a power supply which supplies stable driving voltage to a load, the power consumption of which changes according to its operation state, such as the microprocessor 350 which operates at an operation voltage of 1.5 V. Returning to FIG. 1, detailed description will be made below regarding a configuration of the step-down switching regulator 200 according to the present embodiment.

The step-down switching regulator 200 is a synchronous rectifier step-down switching regulator which includes a control circuit 100 and a switching regulator output circuit 120. The control circuit 100 is monolithically integrated on a single semiconductor substrate, i.e., is provided in the form of an LSI chip. A switching transistor M1 and a synchronous rectifier transistor M2, each of which serves as a switching device, are included within the control circuit 100. Also, the switching transistor M1 and the synchronous rectifier transistor M2 may be provided in the form of discrete devices external to the control circuit 100.

The switching regulator output circuit 120 includes an output inductor L1 and an output capacitor C1. One terminal of the output capacitor is grounded. The other terminal thereof is connected to one terminal of the output inductor L1. The other terminal of the output inductor L1 is connected to the control circuit 100. The step-down switching regulator 200 outputs, to an unshown load, the output voltage Vout, which is the voltage at the output capacitor C1. Description will be made in the present embodiment regarding an arrangement in which the load is a microprocessor 350 shown in FIG. 2.

With the step-down switching regulator 200, the control circuit 100 performs energy conversion so as to step down the output voltage Vin by controlling the current flowing through the output inductor L1. The voltage thus stepped down is smoothed by the capacitor C1. The voltage thus smoothed is supplied as the output voltage Vout to the load connected to the output terminal 204. The current flowing through the load will be referred to as the "load current Iout" hereafter. The current flowing through the output inductor L1 will be referred to as the "inductor current IL" hereafter. Here, the direction of the inductor current IL flowing toward the load is positive by definition.

The control circuit 100 includes, as input/output terminals thereof, an input terminal 102, a switching terminal 104, and a voltage feedback terminal 106. The input terminal 102 is connected to the battery 310, and receives the battery voltage Vbat as the input voltage Vin. The switching terminal 104 is connected to the output inductor L1, which outputs the switching voltage Vsw generated within the control circuit 100. The voltage feedback terminal 106 is a terminal which receives the output voltage Vout applied to the load as feedback.

The control circuit 100 includes a pulse signal generating circuit 10, a driver circuit 20, the switching transistor M1, the synchronous rectifier transistor M2, and a light-load detection circuit 44.

The switching transistor M1 is a P-channel MOS transistor. The source thereof is connected to the input terminal 102, and the drain thereof is connected to the switching terminal 104. The back gate of the switching transistor M1 is connected to the input terminal 102. With such an arrangement, an unshown body diode (parasitic diode) is formed between the back gate of the switching transistor M1 and the drain thereof.

The synchronous rectifier transistor M2 is an N-channel MOS transistor. The source thereof is grounded, and the drain thereof is connected to the drain of the switching transistor M1 and the switching terminal 104. Furthermore, the back gate of the synchronous rectifier transistor M2 is grounded. With such an arrangement, an unshown body diode is formed between the back gate of the synchronous rectifier transistor M2 and the drain thereof.

The switching transistor M1 and the synchronous rectifier transistor M2 are connected in series between the input terminal 102, to which the input voltage Vin is applied, and the ground. With such an arrangement, the voltage at the node at which these two transistor are connected with each other is applied as the switching voltage Vsw to one terminal of the output inductor L1, which is an external component connected to the control circuit 100 via the switching terminal 104.

Figure 3:
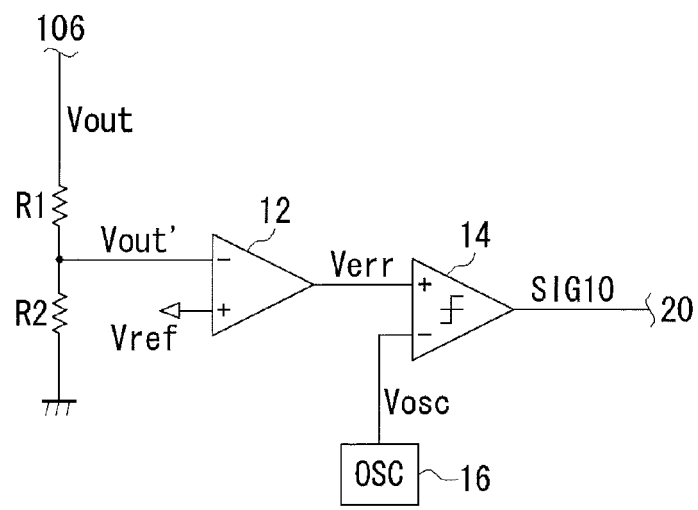
FIG. 3 is a circuit diagram which shows an example of the configuration of a pulse signal generating circuit shown in FIG. 1.

The pulse signal generating circuit 10 receives the output voltage Vout of the step-down switching regulator 200 via the voltage feedback terminal 106. FIG. 3 is a circuit diagram which shows a configuration of the pulse signal generating circuit 10. The pulse signal generating circuit 10 shown in FIG. 3 controls the duty ratio of the pulse signal SIG10 using the pulse width modulation method. The pulse signal generating circuit 10 includes a first resistor R1, a second resistor R2, an error amplifier 12, a PWM comparator 14, and an oscillator 16.

The output voltage Vout returned to the voltage feedback terminal 106 as the feedback voltage is divided by the first resistor R1 and the second resistor R2. The output voltage thus divided, i.e., Vout'=Vout×R2/(R1+R2), is input to the inverting input terminal of the error amplifier 12. The non-inverting input terminal of the error amplifier 12 receives the reference voltage Vref as the input signal. The error amplifier 12 outputs the error voltage Verr by amplifying the difference between the reference voltage Vref and the output voltage Vout' thus divided. The error voltage Verr output from the error amplifier 12 is input to the non-inverting input terminal of the PWM comparator 14.

The oscillator 16 outputs a triangle wave or sawtooth wave cyclic voltage Vosc, which is input to the non-inverting input terminal of the PWM comparator 14. The PWM comparator 14 makes a comparison between the error voltage Verr and the cyclic voltage Vosc. When the error voltage Verr is greater than the cyclic voltage Vosc, the PWM comparator 14 outputs the pulse signal SIG10 in the high-level state. On the other hand, when the error voltage Verr is smaller than the cyclic voltage Vosc, the PWM comparator 14 outputs the pulse signal SIG10 in the low-level state.

As described above, the pulse signal generating circuit 10 generates the pulse signal SIG10 with the duty ratio controlled such that the output voltage Vout of the step-down switching regulator 200 approaches a predetermined reference voltage Vref'=Vref×(R1+R2)/R2. The duty ratio of the pulse signal SIG10 controls the ON-time of the switching transistor M1 and the ON-time of the synchronous rectifier transistor M2.

Description will be made returning to FIG. 1. The driver circuit 20 generates the first gate voltage Vg1, which is to be applied to the gate of the switching transistor M1, and the second gate voltage Vg2, which is to be applied to the gate of the synchronous rectifier transistor M2, based upon the pulse signal SIG10 output from the pulse signal generating circuit 10. When the first gate voltage Vg1 is at the low level, the switching transistor M1 is in the ON-state. When the first gate voltage Vg1 is at the high level, the switching transistor M1 is in the OFF-state. On the other hand, when the second gate voltage Vg2 is at the high level, the synchronous rectifier transistor M2 is in the ON-state. When the second gate voltage Vg2 is at the low level, the synchronous rectifier transistor M2 is in the OFF-state.

The driver circuit 20 sets the ON-time ratio of the switching transistor M1 and that of the synchronous rectifier transistor M2 based upon the duty ratio of the high-level state and the low-level state of the pulse signal SIG10, which alternately turns on/off the switching transistor M1 and the synchronous rectifier transistor M2. Specifically, during a period of time in which the pulse signal SIG10 is in the high-level state, the driver circuit 20 turns on the switching transistor M1, and turns off the synchronous rectifier transistor M2. On the other hand, during a period of time in which the pulse signal SIG10 is in the low-level state, the driver circuit 20 turns off the switching transistor M1, and turns on the synchronous rectifier transistor M2. Also, an arrangement may be made in which a period of time in which the first gate voltage Vg1 is in the high-level state and the second gate voltage Vg2 is in the low-level state (dead time) is provided for each cycle. Such an arrangement prevents the switching transistor M1 and the synchronous rectifier transistor M2 from being in the ON-state at the same time, thereby preventing rush current.

The light-load detection circuit 44 includes a threshold voltage generating unit 40 and a light-load detection comparator 42.

The threshold voltage generating unit 40 generates the threshold voltage Vth. The threshold voltage generating unit 40 is an inverter, the input terminal of which is connected to the gate of the synchronous rectifier transistor M2. The threshold voltage generating unit 40 outputs the output voltage of the inverter, which is used as the threshold voltage Vth, to the light-load detection comparator 42. That is to say, the threshold voltage Vth generated by the threshold voltage generating unit 40 is a voltage that is synchronous with the second gate voltage Vg2 applied to the gate of the synchronous rectifier transistor M2. With such an arrangement, during a period of time in which the synchronous rectifier transistor M2 is to be in the OFF-state, the threshold voltage Vth is in the high-level state. On the other hand, during a period of time in which the synchronous rectifier transistor M2 is to be in the ON-state, the threshold voltage Vth is in the low-level state. Here, in the low-level state, the threshold voltage is set to the ground voltage 0 V. On the other hand, in the high-level state, the threshold voltage is set to the input voltage Vin (=Vbat).

The non-inverting input terminal of the light-load detection comparator 42 is connected to the switching terminal 104, which receives the switching voltage Vsw as an input signal. The inverting input terminal of the light-load detection comparator 42 is connected to the threshold voltage generating unit 40, which receives the threshold voltage Vth as another input signal. The light-load detection comparator 42 compares the switching voltage Vsw with the threshold voltage Vth, and outputs the light-load detection signal SIG12. When the switching voltage Vsw is greater than the threshold voltage Vth, the light-load detection signal SIG12 is set to the high-level state. On the other hand, when the switching voltage Vsw is smaller than the threshold voltage Vth, the light-load detection signal SIG12 is set to the low-level state.

The light-load detection circuit 44 having such a configuration compares the switching signal Vsw with the threshold voltage Vth that is synchronous with the second gate voltage Vg2. Here, the threshold voltage Vth is in the high-level state during a period of time in which the synchronous rectifier transistor M2 is to be in the OFF state. On the other hand, the threshold voltage Vth is in the low-level state during a period of time in which the synchronous rectifier transistor M2 is to be in the ON state. With such an arrangement, when the switching voltage Vsw is greater than the threshold voltage Vth, the light-load detection circuit 44 outputs the light-load detection signal SIG12 in the high-level state.

Upon reception of the high-level light-load detection signal SIG12 output from the light-load detection circuit 44, the driver circuit 20 sets the second gate voltage Vg2 to the low-level state, which forcibly turns off the synchronous rectifier transistor M2.

Figure 4:
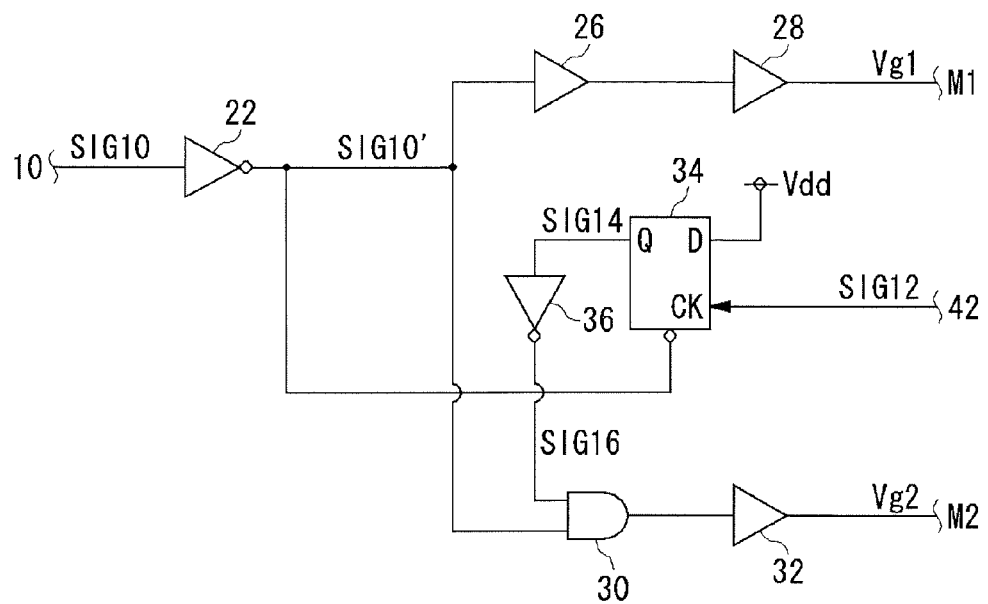
FIG. 4 is a circuit diagram which shows a configuration of a driver circuit shown in FIG. 1.

FIG. 4 is a circuit diagram which shows a configuration of the driver circuit 20. The driver circuit 20 includes an inverter 22, buffers 26, 28, and 32, and an AND gate 30, a D flip-flop 34, and an inverter 36.

The inverter 22 inverts the logical value of the pulse signal SIG10 output from the pulse signal generating circuit 10. The operation of the switching transistor M1 requires sufficient current capacity. Accordingly, the output signal SIG10' of the inverter 22 is amplified by the buffer 26 and the buffer 28. The output signal of the buffer 28 is output to the gate of the switching transistor M1 as the first gate voltage Vg1.

The clock terminal of the D flip-flop 34 receives the light-load detection signal SIG12 output from the light-load detection comparator 42. Furthermore, the reset terminal thereof is connected to the output of the inverter 22, which receives the signal SIG10', which is the inverted signal of the pulse signal SIG10. Moreover, the data terminal is connected to the power supply line, which receives the high-level signal. The output signal SIG14 output from the D flip-flop 34 is inverted by the inverter 36. The AND gate 30 outputs the AND of the output signal SIG16 of the inverter 36 and the output signal SIG10' of the inverter 22 to the buffer 32. The buffer 32 amplifies the output signal of the AND gate 30, and outputs the output signal thus amplified to the gate of the synchronous rectifier transistor M2 as the second gate voltage Vg2. With such an arrangement, the D flip-flop 34 may be replaced with an RS flip-flop.

When the output signal SIG16 of the inverter 36 is in the low-level state, the output signal of the AND gate 30 is fixed to the low-level state regardless of the logical value of the output signal SIG10' of the inverter 22. As a result, during a period when the output signal SIG16 of the inverter 36 is in the low-level state, i.e., during a period when the output signal SIG14 of the D flip-flop 34 is in the high-level state, the synchronous rectifier transistor M2 is forcibly turned off.

Description will be made regarding to the operation of the step-down switching regulator 200 having the above-described configuration with reference to FIGS. 5A through 5H, and FIGS. 6A through 6G. In these drawings, the vertical axis and the horizontal axis are expanded or reduced for simplification of explanation as appropriate.

Figure 5:
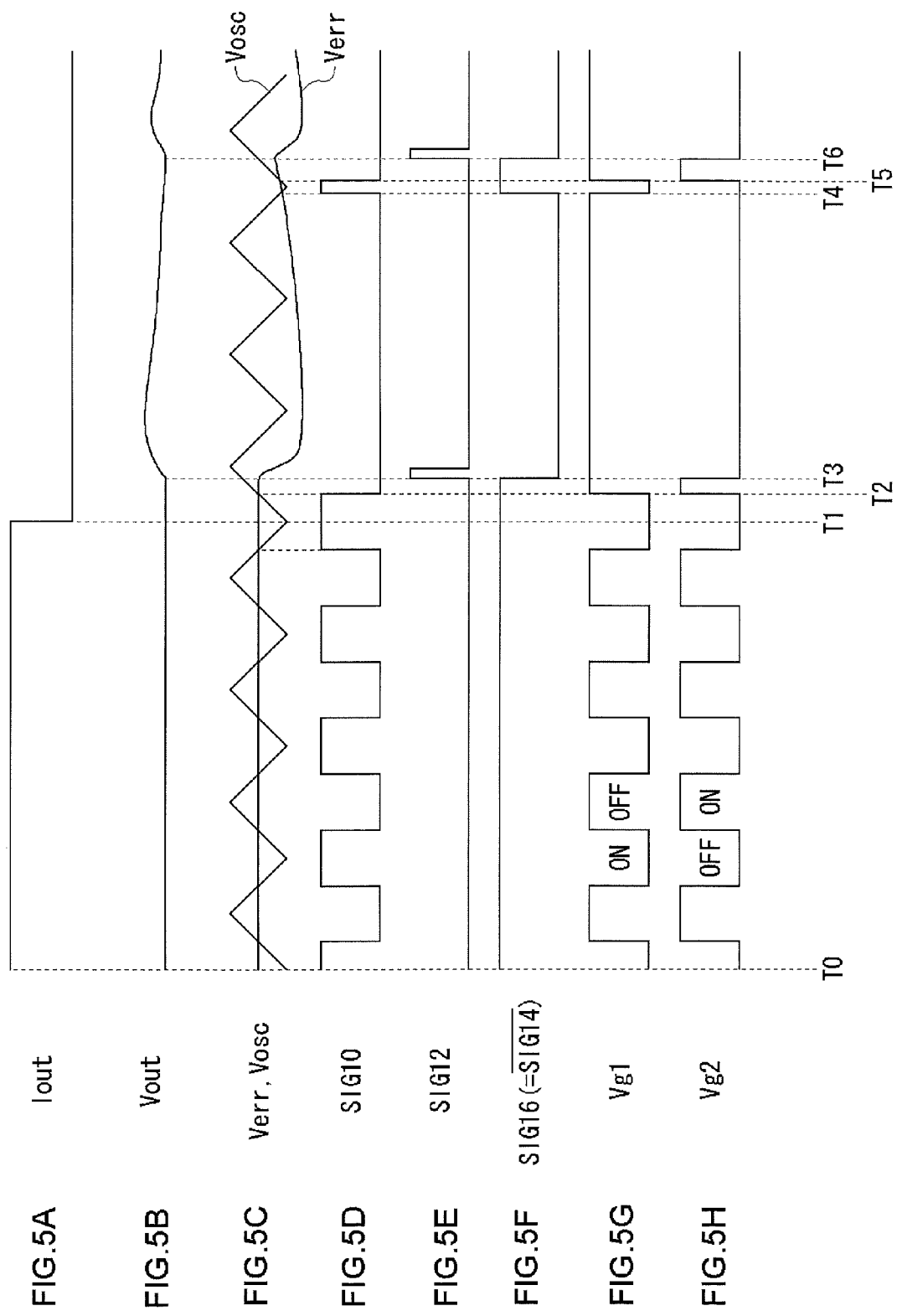
FIGS. 5A through 5H are time charts which show the current waveforms and voltage waveforms of the step-down switching regulator shown in FIG. 1.

FIGS. 5A through 5H are time charts which show the current waveforms and the voltage waveforms of the step-down switching regulator 200 shown in FIG. 1. Specifically, FIG. 5A shows the output current Iout. FIG. 5B shows the output voltage Vout. FIG. 5C shows the error voltage Verro and the cyclic voltage Vosc. FIG. 5D shows the pulse signal SIG10. FIG. 5E shows the light-load detection signal SIG12. FIG. 5F shows the output signal SIG14 of the D flip-flop 34 and the output signal SIG16 of the inverter 36. FIG. 5G shows the first gate voltage Vg1. FIG. 5H shows the second gate voltage Vg2.

During a period from the point in time T0 up to the point in time T1, the step-down switching regulator 200 performs the step-down operation in the heavy load state in which the output current Iout is sufficiently large. Here, at the point in time T1, the load operation state changes and transits to the light-load state in which the output current Iout is small. At the point in time T2, the error voltage Verr becomes smaller than the cyclic voltage Vosc, which sets the pulse signal SIG10 to the low-level state. When the pulse signal SIG10 becomes low-level, the synchronous rectifier transistor M2 is turned on. In this stage, the switching voltage Vsw temporarily becomes smaller than the ground voltage (0 V), following which the switching voltage Vsw gradually increases, and reaches the zero-crossing point at the point in time T3 at which the switching voltage Vsw reaches the ground voltage. Upon detection of the zero-crossing point, the light-load detection comparator outputs the light-load detection signal SIG12 in the high-level state.

When the light-load detection signal SIG12 becomes high-level at the point in time T3, the output signal SIG14 of the D flip-flop 34 becomes high-level (the output signal SIG16 of the inverter 36 becomes low-level). This sets the second gate voltage Vg2 to the low-level state, which forcibly turns off the synchronous rectifier transistor M2.

When the synchronous rectifier transistor M2 is forcibly turned off at the point in time T3, both the switching transistor M1 and the synchronous rectifier transistor M2 are turned off. This increases the output voltage Vout, which decreases the error voltage Verr. The reduction of the error voltage Verr maintains the relation Verr<Vosc. This maintains the low-level state of the pulse signal SIG10 during a period when this relation is satisfied. During a period of time when the pulse signal SIG10 is in the low-level state, the switching transistor M1 is not turned on. Accordingly, in this period, the switching operation is stopped. In the state in which the switching operation is stopped, the output current Iout gradually flows from the output capacitor C1 to the load, which gradually decreases the output voltage Vout. As the output voltage Vout decreases, the error voltage Verr gradually increases.

The error voltage Verr increases, and becomes greater than the cyclic voltage Vosc at the point in time T4. In this stage, the pulse signal SIG10 becomes high-level. This sets the first gate voltage Vg1 to the high-level state, which turns on the switching transistor M1. Furthermore, the high-level state of the pulse signal SIG10 resets the D flip-flop 34, whereupon the output signal SIG14 of the D flip-flop 34 becomes low-level. Accordingly, the output signal SIG16 of the inverter 36 becomes high-level, which cancels the fixed setting of the second gate voltage Vg2.

The error voltage Verr becomes smaller than the cyclic voltage Vosc at the point in time T5. In this stage, both the first gate voltage Vg1 and the second gate voltage Vg2 become high-level. Accordingly, the switching transistor M1 is turned off, and the synchronous rectifier transistor M2 is turned on. In a case in which the light-load state is maintained in this stage, the light-load detection comparator 42 detects the zero-crossing point again. Accordingly, the synchronous rectifier transistor M2 is forcibly turned off at the point in time T6.

Figure 6:
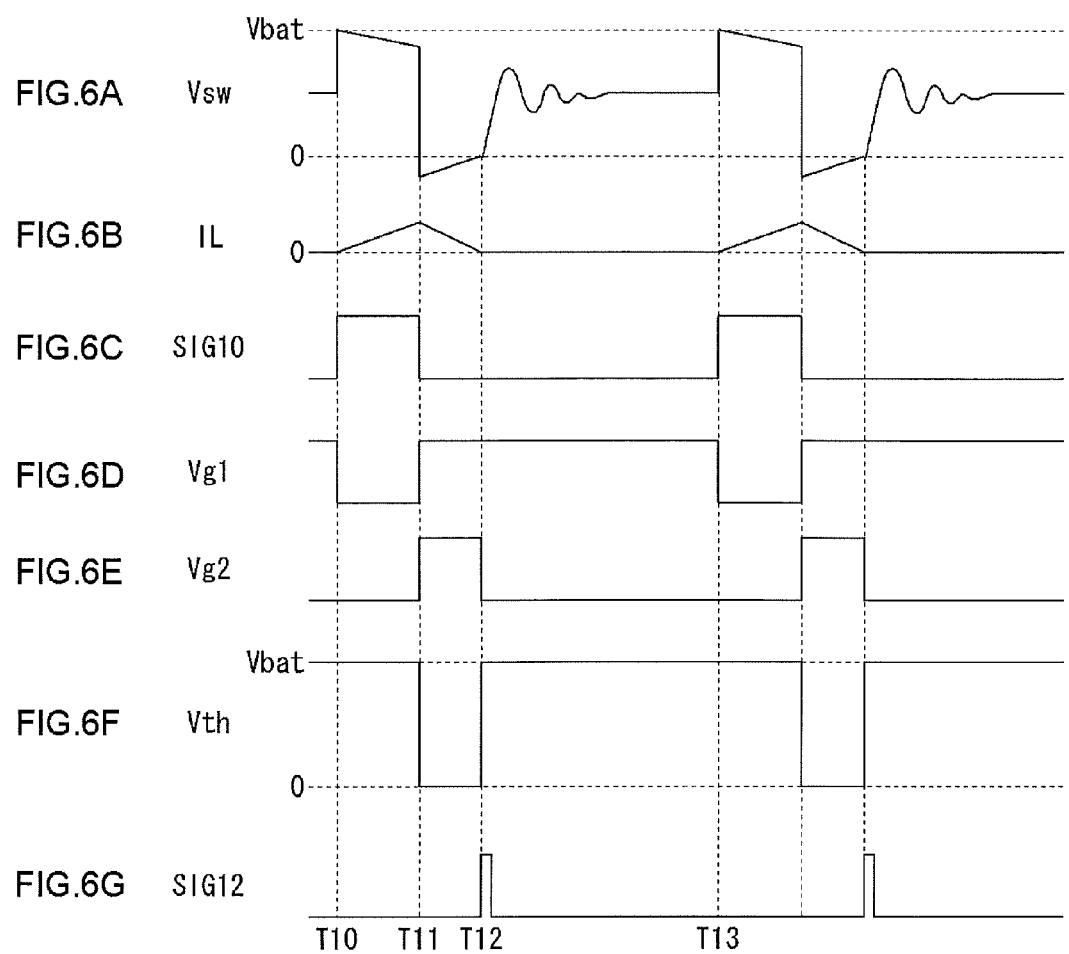
FIGS. 6A through 6G are time charts which show the current waveforms and voltage waveforms of the step-down switching regulator shown in FIG. 1.

FIG. 6A through 6G are time charts which show the operation state of the step-down switching regulator 200. FIG. 6A shows the switching voltage Vsw. FIG. 6B shows the inductor current IL. FIG. 6C shows the pulse signal SIG10. FIG. 6D shows the first gate voltage Vg1. FIG. 6E shows the second gate voltage Vg2. FIG. 6F shows the threshold voltage Vth. FIG. 6G shows the light-load detection signal SIG12.

As shown in the drawings, the pulse signal SIG10 is in the high-level state during a period from the point in time T10 up to the point in time T11, whereupon both the first gate voltage Vg1 and the second gate voltage Vg2, both of which are generated by the driver circuit 20, are in the low-level state. During a period when the first gate voltage Vg1 is in the low-level state, the switching transistor M1 is in the ON-state. Accordingly, the switching voltage Vsw increases up to around the input voltage Vin (=Vbat) input via the input terminal 102. On the other hand, during this period from the point in time T10 up to the point in time T11, the threshold voltage Vth, which is the inverted voltage of the second gate voltage Vg2, is in the high-level state. Here, the second gate voltage Vg2 in the high-level state is equal to the battery voltage Vbat applied to the control circuit 100.

During this period of time from the point in time T10 up to the point in time T11, the condition Vsw>Vth is satisfied. Accordingly, the light-load detection signal SIG12 is maintained in the low-level state. When the pulse signal SIG10 becomes low-level at the point in time T11, both the first gate voltage Vg1 and the second gate voltage Vg2 become high-level. In this stage, the switching transistor M1 is turned off, and the synchronous rectifier transistor M2 is turned on. When the synchronous rectifier transistor M2 becomes the On-state at the point in time T11, the switching voltage Vsw decreases to 0 V or less. Furthermore, when the second gate voltage Vg2 becomes high-level, the threshold voltage Vth output from the threshold voltage generating unit 40 becomes low-level (0 V).

After the point in time T11, the switching voltage Vsw increases as the inductor current IL decreases. Subsequently, the inductor current IL becomes 0 A at the point in time T12. In this stage, the switching voltage Vsw is equal to the threshold voltage Vth (=0 V) at the timing when the current direction reverses, whereupon the zero-crossing point is detected.

At this timing, the light-load detection signal SIG12 becomes high-level. As described above, when the light-load detection signal SIG12 becomes high-level, the second gate voltage Vg2 is set to the low-level state, thereby forcibly turning off the synchronous rectifier transistor M2. When the second gate voltage Vg2 becomes low-level at the point in time T12, the threshold voltage Vth becomes high-level. Accordingly, the switching voltage Vsw becomes smaller than the threshold voltage Vth, whereupon the light-load detection signal SIG12 quickly becomes low-level.

As a result of the synchronous rectifier transistor M2 being forcibly turned off at the point in time T12, both the switching transistor M1 and the synchronous rectifier transistor M2 enter the high-impedance state. Accordingly, in this state, the output inductor IL induces resonance, causing the switching voltage Vsw to oscillate. This state occurs during a period from the point in time T3 up to the point in time T4 in FIGS. 5A through 5H. If the light-load state is continuously maintained, the control circuit 100 repeatedly performs the operation in a cyclic manner from the point in time T10 up to the point in time T13.

Description will be made regarding a comparison between the operation of the step-down switching regulator 200 according to the present embodiment and the operation of an arrangement in which the threshold voltage Vth is fixed to the ground potential.

In an arrangement as shown in FIGS. 9A and 9B, in which the threshold voltage Vth is fixed to the ground potential, the output of the light-load detection comparator 42 is maintained in the high-level state during a period when the switching transistor M1 is in the ON-state. When the synchronous rectifier transistor M2 is turned on, the switching voltage Vsw becomes negative. In this stage, the transition in the output of the light-load detection comparator 42 occurs with a delay time ΔT of the light-load detection comparator 42. This leads to a problem, in that the zero-crossing point cannot be detected during the delay time period ΔT.

On the other hand, with the step-down switching regulator 200 according to the present embodiment, the threshold voltage Vth is generated synchronously with the second gate voltage Vg2. Accordingly, during a period when the switching transistor M1 is in the ON-state, the threshold voltage Vth is in the high-level state. With such an arrangement, the light-load detection comparator 42 is set to the low-level state before the zero-crossing point is detected. As a result, the transition in the output of the light-load detection comparator 42 does not occur just before the zero-crossing point is detected. Accordingly, such an arrangement does not involve the delay time ΔT, and the zero-crossing point is thus detected in a sure manner.

Furthermore, the driver circuit 20 includes the D flip-flop 34 which is set according to the light-load detection signal SIG12, and which is reset according to the pulse signal SIG10. With such an arrangement, the logical value of the second gate voltage Vg2 is forcibly changed according to the output signal SIG14. As a result, such an arrangement suitably stops the switching operations of the switching transistor M1 and the synchronous rectifier transistor M2 during a period from the point in time at which the zero-crossing point is detected up to the point in time at which the switching transistor M1 is instructed to be turned on according to the reduction of the output voltage Vout.

As described above, the step-down switching regulator 200 according to the present embodiment is capable of detecting the zero-crossing point, thereby preventing degradation of the efficiency in the light-load state. Furthermore, the improved efficiency of the step-down switching regulator 200 extends the life of the battery of the electronic device 300 mounting the step-down switching regulator 200.

The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention.

Description has been made in the present embodiment regarding an arrangement in which the pulse signal generating circuit 10 monitors the output voltage Vout so as to generate the pulse signal SIG10 using the PWM method. However, the present invention is not restricted to such an arrangement.

Figure 7:
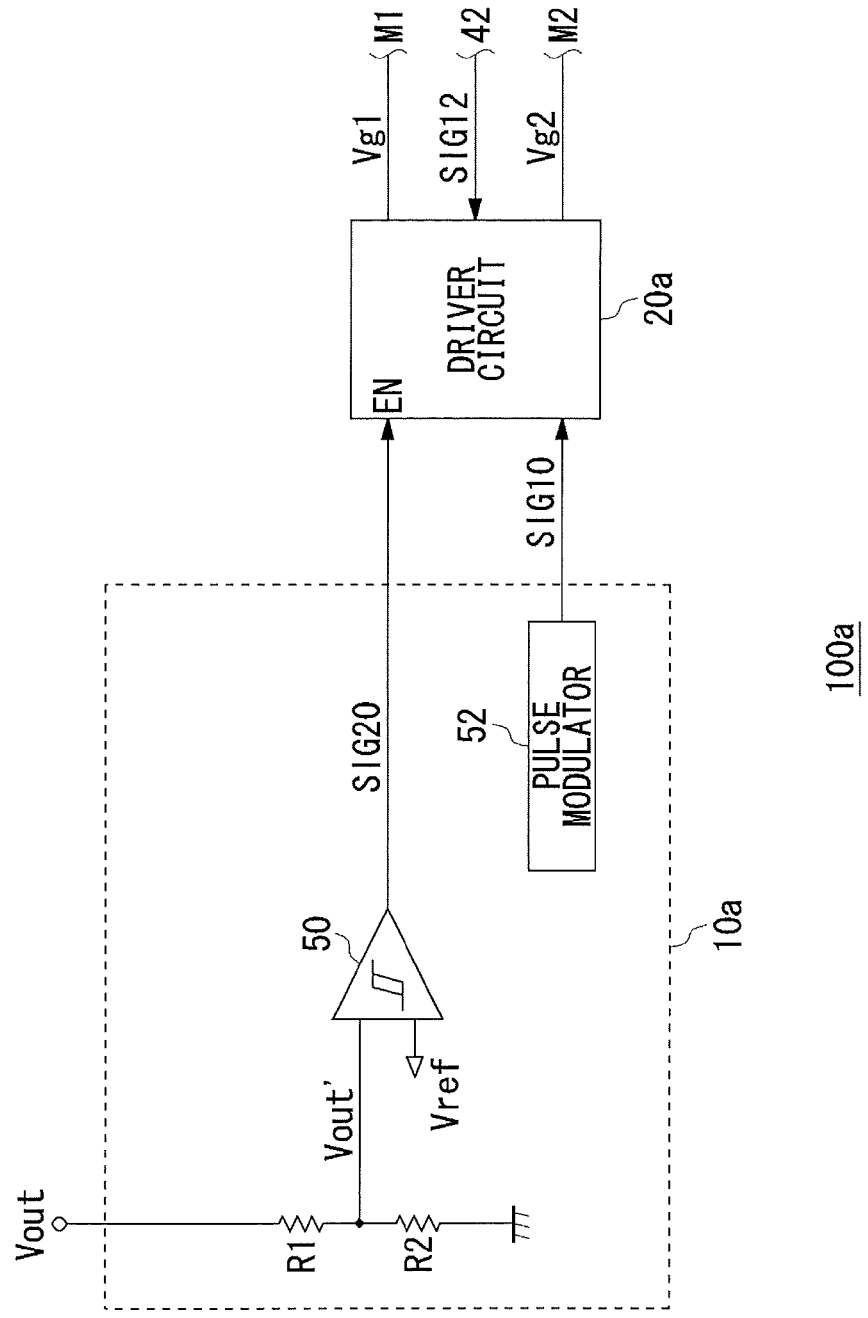
FIG. 7 is a circuit diagram which shows a modification of the control circuit shown in FIG. 1.

FIG. 7 is a circuit diagram which shows a modification of the control circuit 100. In this drawing, the components in common with those shown in FIG. 1 are omitted. A pulse signal generating circuit 10*a* shown in FIG. 7 includes a hysteresis comparator 50, a first resistor R1, a second resistor R2, and a pulse modulator 52. The output voltage Vout is divided by the first resistor R1 and the second resistor R2. The hysteresis comparator 50 makes a comparison between the output voltage Vout' thus divided and the reference voltage Vref.

The pulse modulator 52 outputs the pulse signal SIG10 having a predetermined duty ratio to a driver circuit 20*a*. Furthermore, the driver circuit 20*a* includes an enable terminal EN which receives the output signal SIG20 of the hysteresis comparator 50. The driver circuit 20*a* drives the switching transistor M1 and the synchronous rectifier transistor M2 such that they perform the switching operation during a period when the enable terminal receives the high-level signal. On the other hand, the driver circuit 20*a* stops this switching operation during a period when the enable terminal receives the low-level signal.

The control circuit 100*a* shown in FIG. 7 alternately switches the state between the state in which the switching operation is performed and the state in which the switching operation is stopped according to the pulse signal SIG10 having the predetermined duty ratio, thereby outputting a stable output voltage Vout around the target voltage. That is to say, during a period in time when the switching operation is performed according to the pulse signal SIG10, the output voltage Vout increases according to the passage of time. When the output voltage Vout reaches the first threshold voltage Vmax, the output signal SIG20 becomes low-level. When the output signal SIG20 becomes low-level, the driver circuit 20*a* stops the switching operation. After the switching operation has been stopped, the output voltage Vout decreases according to the passage of time. When the output voltage Vout decreases to the second threshold voltage Vmin which is lower than the first threshold voltage Vmax after the switching operation is stopped, the output signal SIG20 of the hysteresis comparator 50 becomes high-level, whereupon the driver circuit 20*a* starts the switching operation again. The first threshold voltage Vmax and the second threshold voltage Vmin are determined by the hysteresis voltage range of the hysteresis comparator 50.

As described above, the control circuit 100*a* shown in FIG. 7 monitors the output voltage Vout so as to drive the switching transistor M1 and the synchronous rectifier transistor M2, such that their state is alternately switched between the state in which the switching operation is performed and the state in which the switching operation is stopped, using the two threshold voltages provided by the hysteresis comparator 50, thereby controlling the output voltage Vout such that it approaches the target voltage. Also, the light-load detection technique employing the threshold voltage generating unit 40 and the light-load detection comparator 42 according to the present embodiment may preferably be applied to the control circuit 100*a* employing the hysteresis comparator as shown in FIG. 7.

Also, the light-load detection technique employing the threshold voltage generating unit 40 and the light-load detection comparator 42 according to the present embodiment can be applied to a control circuit employing a current mode control method in which the switching operation is controlled based upon the current flowing through the output inductor L1, in addition to the above-described arrangement employing the voltage mode control method in which the switching operation is controlled based upon the output voltage Vout shown in FIGS. 1 and 7. Examples of widely used current mode control methods include the peak current mode control method, the average current mode control method, etc. The light-load detection technique according to the present invention can be suitably applied to all the aforementioned control methods.

Description has been made in the embodiment regarding an arrangement in which the load to be driven by the step-down switching regulator 200 including the control circuit 100 is a microprocessor. However, the present invention is not restricted to such an arrangement. Also, the step-down switching regulator 200 can supply the driving voltage to various loads which operate in the light-load state in which the load current is decreased.

Description has been made in the embodiment regarding an arrangement in which the control circuit 100 is monolithically integrated in the form of a single LSI. However, the present invention is not restricted to such an arrangement. Also, a part of the components may be provided in the form of discrete components or chip components which are external to the LSI. Also, these components may be provided in the form of multiple LSIs.

The settings of the logical values of the signals in the circuit, such as the high-level state and the low-level state of the signals, have been described in the embodiments for exemplary purposes only. The settings can be freely modified by inverting the signals using inverters or the like.

While the preferred embodiments of the present invention have been described using specific terms, such description is for illustrative purposes only, and it is to be understood that changes and variations may be made without departing from the spirit or scope of the appended claims.

What is claimed is:

1. A control circuit for controlling a synchronous rectifier step-down switching regulator comprising:
    an output stage which includes a switching transistor and a synchronous rectifier transistor connected in series, and which supplies a switching voltage at a connection node between said two transistors to a switching regulator output circuit connected as an external component to said control circuit;
    a pulse signal generating circuit which generates a pulse signal having a duty ratio controlled such that the output voltage of said switching regulator approaches a predetermined reference voltage;
    a driver circuit which generates first and second gate voltages, which are to be applied to the gates of said switching transistor and said synchronous rectifier transistor, based upon the pulse signal; and
    a light-load detection circuit which compares the switching voltage with a threshold voltage that is synchronous with the second gate voltage, and that is in the high-level state in a period when said synchronous rectifier transistor is to be turned off and in the low-level state in a period when said synchronous rectifier transistor is to be turned on, and which is configured such that, when the switching voltage is greater than the threshold voltage, said light-load detection circuit outputs a light-load detection signal at a predetermined level, wherein, upon reception of the light-load detection signal at the aforementioned predetermined level from said light-load detection circuit, said driver circuit controls the second gate voltage so as to forcibly turn off said synchronous rectifier transistor.

2. A control circuit according to claim 1, wherein said light-load detection circuit comprises:

a threshold voltage generating unit which generates a threshold voltage that is synchronous with the second gate voltage, and that is in the high-level state during a period when said synchronous rectifier transistor is to be turned off and in the low-level state during a period when said synchronous rectifier transistor is to be turned on; and a light-load detection comparator which compares the switching voltage with the threshold voltage.

3. A control circuit according to claim 2, wherein said threshold voltage generating unit includes an inverter, the input terminal of which is connected to the gate of said synchronous rectifier transistor, and wherein the output signal of said inverter is output as the threshold voltage.

4. A control circuit according to claim 1, wherein the threshold voltage is the logically inverted signal of the second gate voltage.

5. A control circuit according to claim 1, wherein said driver circuit forcibly turns off said synchronous rectifier transistor during a period from the point in time at which said light-load detection circuit outputs a light-load detection signal at the predetermined level up to the point in time at which the pulse signal instructs said switching transistor to turn on.

6. A control circuit according to claim 5, wherein said driver circuit includes a D flip-flop, the clock terminal of which receives the light-load detection signal, and the reset terminal of which receives a signal that corresponds to the pulse signal, and the data terminal of which receives a high-level signal, wherein said synchronous rectifier transistor is forcibly turned off during a period when the output signal of said flip-flop is in the high-level state.

7. A control circuit according to claim 1, wherein said synchronous rectifier transistor is an N-channel MOS transistor.

8. A control circuit according to claim 1, wherein said control circuit is monolithically integrated on a single semiconductor substrate.

9. A step-down switching regulator comprising:

a switching regulator output circuit which includes an output capacitor with one grounded terminal, and an output inductor with one terminal connected to the other terminal of said output capacitor; and a control circuit according to claim 1, which supplies a switching voltage to said switching regulator output circuit, wherein the output at the other terminal of said output capacitor is output as the output voltage.

10. An electronic device comprising:

a battery which outputs battery voltage;

a microprocessor; and a step-down switching regulator according to claim 9, which steps down the battery voltage, and which supplies the battery voltage thus stepped down to said microprocessor.

* * * * *